US006546723B1

(12) United States Patent
Watten et al.

(10) Patent No.: US 6,546,723 B1
(45) Date of Patent: Apr. 15, 2003

(54) HYDROPOWER CONVERSION SYSTEM

(75) Inventors: Barnaby Jude Watten, Winchester, VA (US); Angelo W. Palmisano, Shepherdstown, WV (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/971,448

(22) Filed: Oct. 9, 2001

(51) Int. Cl.[7] ............................................. F16D 31/02

(52) U.S. Cl. ...................................................... 60/398

(58) Field of Search ........................... 60/398; 417/118, 417/189, 137, 329, 187

(56) References Cited

U.S. PATENT DOCUMENTS

| 3,980,894 A | * | 9/1976 | Vary et al. ..................... 60/398 |
| 5,095,705 A | * | 3/1992 | Daly ............................ 60/398 |
| 5,377,485 A | * | 1/1995 | Bellamy ....................... 60/398 |

* cited by examiner

Primary Examiner—Edward K. Look
Assistant Examiner—Thomas E. Lazo
(74) Attorney, Agent, or Firm—Mark Homer (57) ABSTRACT

A hydropower conversion system is provided which uses a hydraulic gradient to accelerate water in a drive pipe. A valve is disposed in the drive pipe to interrupt the flow of water and thus create a temporary negative pressure within the drive pipe. A negative pressure relief device with a riser section is coupled to the drive pipe and is adapted to pull air but not water into the riser section when under negative pressure. A pneumatic device such as a power turbine is coupled to the negative pressure relief device.

29 Claims, 7 Drawing Sheets

HYDROPOWER CONVERSION SYSTEM

STATEMENT REGARDING FEDERALLY SPONSORED RESEARCH

This invention was made by employees of the United States Government and may be manufactured and used by or for the Government for governmental purposes without the payment of any royalties.

BACKGROUND OF THE INVENTION

1. Field of the Invention

The present invention relates to a hydropower conversion method and system, and in particular, to a system and method of using a hydraulic gradient to create a temporary negative pressure for use in operating a pneumatic device.

2. Background of the Invention

Generation of electrical energy is needed to support the world's growing population and economy. Personal, commercial and defense energy demands are currently taxing the existing electrical energy supply. To meet the electrical energy demand, there has been great interest in exploiting renewable energy resources, such as hydroelectric power. Hydroelectric power is seen as an energy source which will reduce dependence on foreign energy and avoid potentially costly and possible negative environmental effects linked to non-renewable energy production technology. Examples of some environmental concerns include carbon dioxide emissions, acidic mine drainage from coal extraction waste, heat disposal and radioactive fission products produced during nuclear energy generation.

Hydroelectric energy has been seen as an alternative electrical energy generation system that has few potentially negative environmental effects. However, dams used in conventional hydroelectric power systems have been linked to negative physical, chemical and biological effects on the bodies of water to which these dams are disposed. These negative environmental effects manifest themselves in habitat destruction, obstructions to natural fish movement, poor water quality, over harvest and competition from non-indigenous species. Further, hydroelectric dams may degrade riverine habitat and impede movement of migratory fishes to and from their natal streams.

In a conventional hydroelectric power system, potential energy is used to accelerate water in a discharge line (i.e., penstock) of variable length, geometry and slope. The accelerated water is then directed through a turbine assembly designed to convert the kinetic energy of the water into mechanical energy. The gross head, H, available for acceleration is the elevation differential between the forebay water surface and the tailwater surface as provided by the formula:

$$\text{Gross Head (ft)} = (\text{Elevation}_{forebay}) - (\text{Elevation}_{tailwater}) \quad (1)$$

The energy potential represents the product of gross head and the volumetric flow rate of water through the system as provided by:

$$\text{Energy Potential (kWh)} = 306.6 \cdot Q \cdot H \quad (2)$$

where
Q=water flow rate (ft³/s)
H=gross head (ft).

For effective use, H has a minimum value of 10 feet. As H drops towards the minimum acceptable value of 10 feet, the water velocities achieved become unacceptably low so as to be impractical for use in hydroelectric generation. Implementation of a conventional hydroelectric system with these low water velocities would require the employment of a large diameter, slowly rotating turbine design. Such a design would involve an excessive capital investment to deploy.

Bernoulli's equation applied to the forebay and the tailwater conditions allows calculation of the maximum water velocity ($V_{max}$) in the turbine inlet as $$\left(\frac{P}{\gamma} + Z + \frac{V^2}{2G}\right)_{forebay} = \left(\frac{P}{\gamma} + Z + \frac{V^2}{2G}\right)_{tailwater} \quad (3)$$

where
P=pressure (psig)
$\gamma$=specific weight of water (lb/ft³)
V=velocity (ft/s)
G=gravity (32 ft/s²)
Z=elevation head (ft)

Since P and V at both locations are negligible and neglecting minor line losses (friction), $V_{max}$ is $$V_{max}(\text{ft/s}) = \sqrt{(2g(Z_1 - Z_2))}. \quad (4)$$

For example, with H defined as $Z_1-Z_2$, of 10 feet, $V_{max}$ is 25.4 ft/s whereas an H of 100 feet provides a $V_{max}$ of 80.2 ft/s. Hence, for a given volumetric flow rate (Q), the penstock cross-sectional area required at H=10 feet is 3.16 times that required at H=100 feet. The lower water velocity also results in reduced turbine tip speeds and thus increases turbine shaft requirements, e.g., costs, for a given power output.

Torque applied to the turbine shaft determines the diameter of the turbine shaft. Further, the turbine shaft diameter is directly related to power and shaft speed:

$$\text{torque (pound-inches)} = \frac{63025 \cdot HP}{RPM} \quad (5)$$

where
HP=horsepower
RPM=shaft speed (revolutions per minute).

Unfortunately, large values of H result in problems associated with greater forebay volumes and the need for equipment that allows for the movement of fish both upstream and downstream. Excessive shear, turbulence, flow separation, and gas supersaturation are also of primary concern.

A disadvantage with the design of conventional hydroelectric power generation systems is that these systems are unable to produce power under low-head conditions (i.e., less than ten feet) economically or without potentially negative environmental effects. Examples of such hydroelectric power designs include Pelton, Francis, Turgo, Kaplan and cross-flow designs. Due to the inability of these conventional systems to function under low-head conditions, several alternative designs have been developed for low-head applications.

For example, in EPO Patent 0,117,739 to Smith, there is disclosed a water engine design having reciprocating floats in vertical chambers that rise and fall with water levels as directed by inlet and exhaust valves. Power is transmitted by oscillation of a pivotally mounted beam assembly.

In U.S. Pat. No. 4,782,663 to Bellamy, there is disclosed a pneumatic hydroelectric power conversion system. Power is generated by passing water in sequence over flexible bags or membranes to displace air under the flexible bags. Power is developed by directing the displaced air through an air turbine coupled with a generator.

In U.S. Pat. Nos. 5,074,710, 4,095,423, 4,103,490 and 4,464,080, all to Gorlov, there are disclosed various apparatus that include one or more vertical chambers with parts of ingress and egress through which tidal or river flows are directed so as to alternately force air out and into the chambers via an air motor or a turbine.

In EPO Patent 0,339,246 to Loughridge, there is disclosed a power generation system similar to that of Gorlov but designed so as to introduce water alternately into one of two columns thereby tangentially creating a swirling action that minimizes hydraulic losses.

In U.S. Pat. No. 4,288,985 to Dyck, there is disclosed an apparatus that uses two reservoirs influenced by tidal action to force water back and forth through an air tight duct system in which a turbine is mounted for producing power.

In U.S. Pat. No. 5,377,485, EPO Patent 0,526,470 B1, and PCT Patent WO 91/17359, all to Bellamy, there are disclosed various power conversion systems that direct water through a duct and as a result, the water induces air into the duct. The induced airflow exits the duct through an exhaust duct and is drawn through an air turbine. The air is introduced into the duct by siphon, air injectors or venturis.

In EPO Patent 0,100,799 to Cary, there is disclosed an apparatus that makes use of a descending column of water to entrain and compress air on a continuous basis. The air is separated from the water at a particular depth through the use of a tangentially fed air inclusion chamber. The compressed air is then used to supply air to a gas turbine or ramjet.

In EPO Patent 0,162,814 to Burgnoli, there is disclosed an apparatus that improves the efficiency of a hydraulic air compressor, such as that described in the Cary patent, by recirculating air that is under negative gauge pressure as the air exits an air motor designed to produce power.

In U.S. Pat. No. 4,098,081 to Woodman, there is disclosed a power generation system that uses a plurality of tidal chambers which are filled in succession during rising tide and which are allowed to sequentially empty during falling tide. Air flows across a turbine as a manifold and a valve means communicates air pressure and vacuum from the tidal chambers.

The systems developed thus far generally have one or more of the following disadvantages; too complex, require excessive capital, create undesirable levels of gas supersaturation in water, lack efficient means of converting low pressure air flows into power, require materials that have yet to be developed or have low energy production potentials so as to not be viably practical as a hydroelectric power system. Therefore, in spite of the recently developed designs, there is still a need for an efficient and economical low-head power conversion system that minimizes damage to the environment.

For example, there is a need to reduce impacts on fishery resources through application of improved hydropower technologies, specifically those that reduce required dam height, eliminate turbine blade induced mortality of migrating fishes and limit or prevent supersaturation of water with air which has been linked to gas bubble disease of aquatic species. Further, there is need for an economical method that converts low grade (low head) energy potentials into high grade (high air pressure differential) energy sources so as to minimize the scale and cost of the energy conversion equipment.

BRIEF SUMMARY OF THE INVENTION

In accordance with the present invention, a hydropower conversion system is provided which uses a hydraulic gradient to accelerate water in a drive pipe thus converting potential energy into kinetic energy. A closure device, such as a valve, is positioned downstream of an inlet of the drive pipe to interrupt water flow in the drive pipe, thus creating a temporary negative pressure down stream of the valve. A negative pressure relief device is coupled to the drive pipe and is positioned near the valve. The negative pressure relief device includes a riser section which allows the negative pressure to pull gas (e.g. air) but not water into the riser section when the pressure relief device is under negative pressure (i.e. a vacuum). A standing column of water in the riser section assists in pulling the gas into the riser section.

Gas under vacuum powers a turbine or other pneumatic equipment including water lifters (i.e. pumps). A timer, pressure or mechanical linkage is provided to open the drive pipe valve to reestablish water flow in the drive pipe to thereby allow a repeat of the power generation steps. The reestablished water flow and pressure is used to force gas out of the riser section and into the atmosphere or to recovery equipment operable by gas flow. A vacuum tank may be used to store energy as gas under vacuum.

In varying embodiments, two or more independent hydropower conversion systems may operate in series or parallel to reduce variations in the vacuum tank gas flow. In addition, air expansion in the hydropower system may be used to establish a refrigeration potential.

An object of the present invention relates to providing hydroelectric power or an inexpensive water pumping potential using previously untapped low head resources such as rivers and tidal flows.

Another object of the present invention relates to providing a hydroelectric power system which can be adapted to capture additional energy from the tailwaters from large conventional hydroelectric and coal fired power systems.

A further object of the present invention relates to providing a hydroelectric power system which does not negatively impact aquatic resources.

An additional object of the present invention relates to providing a hydroelectric power system for use by a single user or residence to supplement other methods of on-site energy production such as wind, solar, and geothermal.

Yet another object of the present invention is to provide a hydroelectric, water pumping, and refrigeration system for use in underdeveloped regions of the world.

A further object of the present invention relates to providing a hydroelectric power system which may be adapted for use as part of a localized or widespread distributed system of diverse electric power generation sources.

According to one aspect of the present invention, a hydropower conversion system is provided which uses a hydraulic gradient to accelerate a flow of water. A drive pipe has an inlet and an outlet for communicating the water flow. A valve is disposed downstream from the inlet for interrupting the water flow into the drive pipe to thereby create a temporary negative pressure downstream from the valve. A negative pressure relief device includes a riser section coupled to the drive pipe downstream from the valve. The negative pressure relief system is for pulling gas but not water into the riser section when the negative pressure relief device is subject to negative pressure. A pneumatic device is coupled to the riser section of the negative pressure relief device and powered by the negative pressure.

According to another aspect of the present invention, a method is provided for hydropower conversion using a hydraulic gradient. The method comprises using the hydraulic gradient to accelerate a quantity of water into an inlet of a drive pipe. The flow of water is interrupted in the drive pipe to create a temporary negative pressure in the drive pipe. Gas is pulled into a pressure relief device coupled to the drive pipe, without introducing water into the pressure relief device, using the negative pressure. A pneumatic device is coupled to the pressure relief device and is powered from the negative pressure.

A key feature of the present invention concerns the capability to generate hydropower energy efficiently at hydraulic heads that are well below the minimum required to support conventional hydroturbine designs and to achieve this result without the need for water to pass through rotating turbine blades. Potential water sources with which the present invention may be employed include free flowing streams, channel courses and tidal flows.

An advantage of minimizing head requirements is the increase in the number of potential application sites while, in some cases, eliminating the need for permanent water control structures such as dams. The elimination of the need for water to pass through rotating turbine blades obviates excessive shear, strike and pressure changes known to harm entrained fish and other forms of aquatic life. Therefore, an additional advantage of the present invention concerns circumventing the problem of excessive shear, turbulence, flow separation and gas supersaturation by developing equipment capable of economically recovering energy from water in low head applications.

An additional feature of the present invention concerns the use of power converted above flood stages to minimize construction costs. The air turbine generator assembly and control system can be located out of the river channel, e.g. on high ground, thereby reducing construction costs. Further, a single air turbine generator assembly could serve several sites thereby allowing for centralized power production.

Another feature of the present invention concerns the use of the vacuum developed during operation to provide for gas cooling without the need for conventional inefficient refrigeration cycles. Expansion of gas from atmospheric pressure to subatmospheric pressure will result in gas cooling due to the Joule-Thompson effect. Consequently, the expansion of gas could be used as an alternative to conventional, inefficient refrigeration cycles based on freon or ammonia gas.

A further feature of the present invention concerns the ability to operate with entrained particulate matter such as sand that impairs performance of conventional hydroelectric power systems. As a result, pretreatment costs are minimized.

An additional feature of the present invention concerns the control of vacuum pressure generated so as to maintain pressure differentials that allows for economical energy recovery while also minimizing effects on entrained fish.

Yet a further feature of the present invention concerns the generation of high levels of vacuum. These high levels of vacuum allow for the use of small, cost effective, air motors and turbines that spin at speeds equal to, or greater than, the 60 Hz power line frequency. In addition, these high levels of vacuum allow for the direct suction lift of water to levels tens of feet above the water source. This eliminates the need for motors, pumps and power control systems used in conventional water pumping stations thereby providing for a savings in cost and an increase in energy transfer efficiency.

An additional feature of the present invention relates to storing energy for later use by creating a vacuum in tanks or gas tight underground structures. This is feasible as a result of the unique and high levels of vacuum possible by use of the invention.

An additional feature of the present invention relates to using the natural slope of a flowing water source to establish the hydraulic gradient. An advantage of this modification is provided in the elimination of the need for a dam, thereby reducing environmental effects and construction costs associated with dams employed in conventional hydroelectric power systems.

Yet another feature of the present invention relates to using tidal flows of a water source to establish the hydraulic gradient. As with the use of the natural slope of a flowing water source, an advantage of this modification is provided in the elimination of the need for a dam as well as being able to use previously untapped water sources to generate power.

An additional advantage of the present invention concerns the elimination of a rotating turbine blade assembly in direct contact with flowing water found in most conventional hydropower generation systems. As a result, there is a major cost saving provided by the present invention over those conventional systems which require a very large and slowly rotating assembly. A further advantage is provided by the elimination of blade induced mortality in fish resulting from strike, shear, turbulence and pressure forces possible in conventional systems.

A further advantage of the present invention concerns the ability to operate with a minimal hydraulic gradient which, in many cases, eliminates the need for dams thus circumventing the problems associated with sediment build-up, fish movement, water temperature and costs associated with dams. However, if a dam is required, the dam height requirement will be within the range of low-head inflatable dam structures available commercially at relatively low cost.

Further features and advantages of the present invention will be set forth in, or apparent from, the detailed description of preferred embodiments thereof which follows.

BRIEF DESCRIPTION OF THE DRAWING

FIG. 3b is a front view, and FIG. 3c is a top view of a portion of the hydropower conversion system of FIG. 3a;

DETAILED DESCRIPTION OF THE INVENTION

The general principle which underlies the present invention is the conversion of potential energy into mechanical energy by accelerating a relatively large mass of water in a drive pipe section and then decelerating the water using a valve and a negative pressure relief system. The rapid deceleration of water acts to concentrate energy potentials (H) in the form of negative pressure. The system uses the negative pressure to pull gas to power a turbine.

Figure 1:
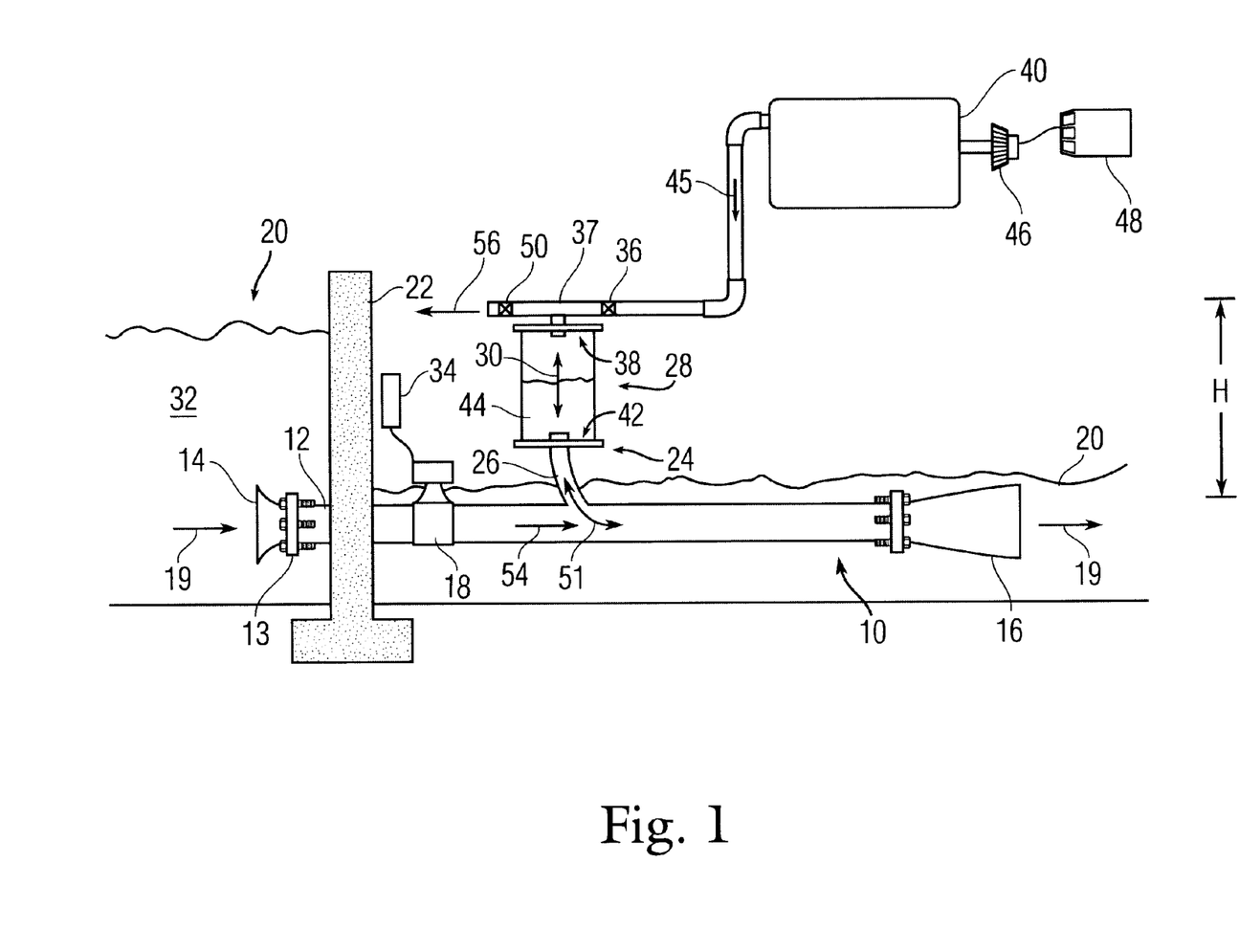
FIG. 1 is a schematic diagram of a hydropower conversion system using a dam to create a hydraulic gradient, according to the present invention.

Further features and advantages of the present invention will be described with reference to the drawings where similar numbers represent like elements in the several views and are only identified specifically where the elements differ. Turning now to FIG. 1, there is depicted a simplified schematic diagram of a hydropower generator system 10. A drive pipe 12 is fitted with a belled inlet 14 and a diverging cone section 16 at the discharge end to minimize entrance and exit energy losses, respectively. The length, cross-sectional area and shape of drive pipe 12 will vary based on site conditions. For example, the cross-sectional shape can be circular or non-circular.

A drive pipe valve 18 is positioned downstream of the belled inlet 14 and is designed to stop and start the movement of water through the drive pipe 12 (water flow direction denoted by arrows 19). Advantageously, drive pipe valve 18 is placed as close to the belled inlet 14 as possible. The drive pipe 12 is disposed in a water source 20 where a dam 22 or other structure establishes a hydraulic gradient.

A pressure relief system 24 includes a conduit 26 and a riser section 28. Advantageously, the conduit connection of the conduit 26 to the drive pipe 12 should be positioned as close as possible to the downstream side of the valve 18. Water within the riser section 28 acts as a reciprocating piston via water level variation denoted by arrow 30, which, in turn, allows water, but not gas, to enter the drive pipe 12 after the drive valve 18 is closed. This eliminates energy losses resulting from expansion and compression of entrained gas. In addition, the pressure relief system 24 allows gas, but not to water, to enter the riser section 28 after the drive pipe valve 18 is closed.

The ratio of time the drive valve 18 is closed to the duration of time the drive valve 18 is opened, i.e., the percent of flow, affects the performance of the hydropower system 10. Advantageously, a valve closed duration of about 60% of the flow period maximizes performance of the hydropower generator system in terms of reducing the time necessary to establish a desired vacuum. Further, water consumption may be reduced by increasing vacuum and using shorter valve closure speeds.

A power deceleration phase during the operation of hydropower system 10 works as follows. Upon achieving some preset value of velocity and liquid mass (i.e., volume) based on the gross head, denoted H, and drive pipe 12 geometry, the flow of water into the inlet 14 from the forebay 32 is interrupted via closing the drive pipe valve 18 using a valve control 34. The drive valve 18 closes during a short period of time (e.g., a second). Optimally, the drive valve 18 is closed for about 60% of the flow period to maximize performance, i.e. minimize the time necessary to produce a desired amount of vacuum.

At this point, the water in motion possesses kinetic energy ($K_e$). The kinetic energy is equivalent to the work required to overcome the effects of inertia:

$$w = K_e = \frac{Wgt}{2g}(V_f^2 - V_i^2) \qquad (6)$$

where
  w=work due in inertia (ft-lb)
  Wgt=weight of water in drive pipe (lb)
  g=acceleration due to gravity (ft/sec$^2$)
  $V_f$=final velocity (ft/sec)
  $V_i$=initial velocity (ft/sec).

Following the closure of the drive pipe valve 18, the kinetic energy ($K_e$) is recovered by the subsequent opening of an intake check valve 36 of vacuum line that connects the elevated end 38 of the pressure relief system 24 to a vacuum tank 40. The momentum of the water in the drive pipe 12 and the weight of the water in the riser section 28, i.e., the water column 44, pulls gas (denoted by arrow 45) from the vacuum tank 40 behind the water as the water travels towards a lower end 42 of the pressure relief system 24.

The close proximity of the valve 18 to the inlet end 14 of the drive pipe 12 and the close proximity of the connection of conduit 26 to the downstream side of the drive pipe valve 18 maximizes the mass of accelerated water creating the vacuum. If the drive valve position 18 is moved towards the discharge end of the drive pipe, e.g., toward the diverging cone section 16, the accelerated water upstream of the drive valve 18 will cause a pressure surge (i.e., water hammer) when the drive pipe valve 18 is closed. The pressure surge is undesirable in terms of both energy conservation and material (e.g., drive pipe 12) stress.

The regulation of the vacuum level in the vacuum tank 40 provides control of the braking force on the water column 44 and thus controls the time required to reduce the water velocity in the drive pipe 12 downstream from the drive pipe valve 18 to zero or some other preset value. Vacuum regulation is achieved primarily by drag induced from an air turbine 46 operating off of the desired pressure drop created and the gas demand of the air turbine 46.

The air turbine 46 is coupled to a device requiring power input such as an electrical generator 48. Upon reaching the desired level of energy recovery, the drive pipe valve 18 is re-opened again for a short period of time, the intake check valve 36 is closed or closes given pressure differential (described below), and water again is accelerated in the drive pipe 12, thereby allowing the process to be repeated.

During an acceleration phase of the operation of hydropower system 10, an air release check valve 50 opens due to positive gas pressure that develops as water is first pulled up into the riser section 28 from the drive pipe 12 through the pressure relief conduit 26 (water flow denoted by arrow 51). The water is first pulled up into the riser section 28 by the vacuum present and then the water is forced further by the head pressure on the inlet 54 to the drive pipe 12. The release of the gas (denoted by arrow 56) acts to flood the riser section 28 with water which, in turn, increases energy conversion during the next cycle of the hydropower system 10.

Operating more than one drive pipe 12 and pressure relief system 24, connected in parallel to the vacuum tank 40 and the air turbine 46, allows for uninterrupted water and air flow through a hydropower system. The maximum vacuum levels achieved will be limited by water vaporization pressures that are temperature dependent but can approach—14 psig. Hence a low pressure water supply (H) application can generate air pressure differentials that exceed an equivalent water height of 32 feet. The use of gas (e.g., air) combined with elevated pressure drops provides for a dramatic reduction in the size and associated cost of the turbine. The $V_{max}$ for air at a given air density and pressure drop can be determined using the equation describing isentropic expansion:

$$V_{max} = \left(\frac{2gK}{K-1} \cdot \frac{P}{P}\left[1 - \left(\frac{P_2}{P_1}\right)^{\left(\frac{K-1}{K}\right)}\right]\right)^{1/2} \quad (7)$$

where $V_{max}$=air velocity (ft/s)
P=density of air at given temperature (lb/ft$^3$)
K=ratio of specific heat and volume for air (dimensionless)
P=pressure (absolute, lb/ft$^2$)
g=acceleration due to gravity (ft/sec$^2$).

Using an air density of 0.075 lb/ft$^3$ (70° F.) and a pressure differential of 10 psig, $V_{max}$ is 1330 ft/s. This represents a 52.4 fold increase over that predicted for water at H=10 feet and allows similar increases in turbine tip speed. High turbine speeds reduce turbine size and torque based shaft requirements as provided by the relation of Equation 5.

Further, gas cooling could be used for refrigeration, as the gas temperature drops after adiabatic expansion which is given by the relationship:

$$T_2 = T_1(P_2/P_1)^{0.283} \quad (8)$$

Where $T_1$=inlet gas temperature (°R where °R=460+° F.)
$T_2$=outlet gas temperature (°R)
$P_2$=turbine outlet pressure (psi absolute)
$P_1$=turbine inlet pressure (psi absolute).

With $T_1$=460+70° F., $P_1$=14.7 psia and $P_2$=14.7−10 psia, $T_2$ is then 383.8°R or −76° F. Using a specific heat for air of 0.24 and an inlet air density of 0.075 lb/ft$^3$ provides a cooling capacity of 1.37 BTU/ft$^3$ gas expanded. The volume of gas expanded per cycle can be computed given the velocity of water in the drive pipe 12, the diameter and length of the drive pipe 12, and the vacuum developed in the turbine system, given that:

$$F = m \cdot a \quad (9)$$

where

F=force (lb$_f$)
m=mass (lb weight/g)
a=acceleration (ft/s$^2$).

The deceleration of water in the drive pipe is:

$$a = [(P_2 - P_1)(144\pi r^2)]/[((\pi r^2)(L)(\gamma))/g] \quad (10)$$

where $P_1$=pressure at turbine discharge (psig) (vacuum tank)
$P_2$=pressure at discharge end of drive pipe (psig)
r=drive pipe radius (ft)
L=drive pipe length (flooded section) (ft)
γ=specific weight of water (lb/ft$^3$)
g=gravity
a=ft/s$^2$ and the resulting time required to slow the water in the drive pipe to some desired velocity is $$t = (V_{start} - V_{final})/a \quad (11)$$

where t=time (s)
$V_{start}$=water velocity at time of valve closure (ft/s)
$V_{final}$=water velocity at time of valve opening (ft/s).

The resultant t and the $V_{start}$ and $V_{final}$ values now allow calculation of the volume of gas pulled into the drive pipe per cycle:

$$(Volume)_d = (t)\left(\frac{V_{start} - V_{final}}{2}\right)(\pi r^2) \quad (12)$$

where $(Volume)_d$ volume of air in drive pipe (ft$^3$).

For example, a two inch diameter drive pipe with a length of 100 feet and a $V_{start}$ of 10 feet/s results in the following computations when $P_1$ is −10 psia and $P_2$ is 0:

from Equation 10, acceleration (negative) is:

$$a = (0 - 10)(144\pi 0.0833^2)/[((\pi 0.0833^2)(100)(62.4))/32.3]$$
$$= -31.4/4.22 = -7.43 \text{ ft/s};$$

from Equation 11, t is
t=(0−10)/7.43=1.34 sec; and
from Equation 12, air volume is then $$(1.34)\left(\frac{0-10}{2}\right)(\pi 0.0833^2) = 0.146 \text{ ft}^3$$

This volume can be adjusted to standard conditions (1 atm pressure, 70° F.) if desired using the ideal gas law. Repeating the cycle every 2.68 seconds would provide for a BTU (cooling) yield/day of:

Yield=(4707 ft$^3$/d)(1.37 BTU/ft$^3$)
(BTU/d)=6448.

This is equivalent to 78 watts of power generated constantly throughout a 24-hour period.

These calculations ignore the potential benefit of designing the negative pressure relief riser section 28 so as to minimize water level change during the down stroke noting that water level changes decrease as riser diameter increases.

Using the preceding example of a 2" diameter by a 100 foot long pipe section operated at a water velocity of 10 ft/s, a $P_1$ of −10 psig and a $P_2$ of zero, the head (H) required to establish the desired velocity is about 20 feet. A riser section that provides a mean water level of 10 feet during the down stroke would have a resulting deceleration rate of −4.22 ft/s$^2$ (Equation 10), a time required to slow the water velocity in the drive pipe 12 to zero of 2.344 seconds (Equation 11), and an air volume of 0.255 ft$^3$ (Equation 12). In this example, maintenance of the water level mean at 10 feet improved the work done on air by a factor of 1.75.

Energy recovery can be enhanced further by using the potential energy of the air under vacuum present in the riser section 28 at the end of the deceleration phase. For example, gas under vacuum could be used to actuate the opening of the drive pipe valve 18 to start the acceleration phase. Gas 56 under pressure could be used to operate the turbine 46 or other additional pneumatic equipment (discussed below).

Figure 2:
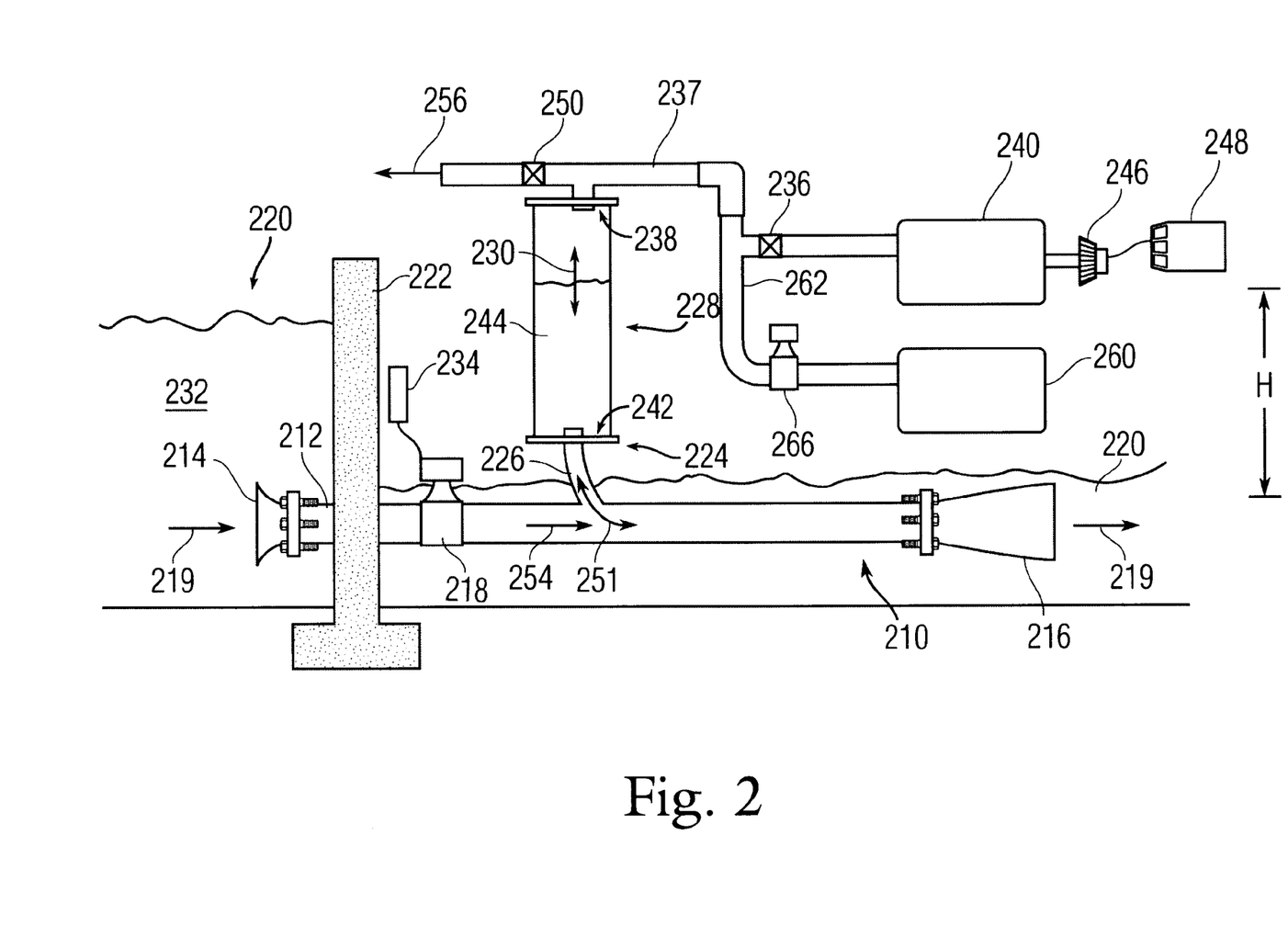
FIG. 2 is a schematic diagram of an alternative hydropower conversion system employing two vacuum tanks, according to the present invention.

Turning now to FIG. 2, in an alternative embodiment, hydropower generator 210 utilizes gas under a vacuum to pull water in a riser section 228 up to an elevation that exceeds the height of the water supply elevation, H, established by the dam 222.

In order to achieve the desired water elevation, a second vacuum tank 260 is coupled to a pressure relief system 224 via a conduit 262 and timer operated, quick acting air valve 266. Valve sequencing of a drive pipe valve 218 and the valve 266 are established with either a mechanical linkage or a time based electronic valve controller 234. Water within riser section 228 acts as a reciprocating piston via water level variation denoted by arrow 230. For example, following closure of valve 218, water in the riser 228 reaches a minimum value. Valve 266 is then opened to evacuate vacuum tank 260 and charge riser 228 with more air. Valve 222 is then closed and valve 218 opened. Water rises in column 228 to a level close to 220 as provided by dam 222. At this point, valve 266 is opened allowing vacuum stored in tank 260 to pull additional water into column 228 providing a water level that exceed 220. Valve 266 is then closed and valve 218 opened so as to repeat the power generation steps. As with the hydropower generator 10, the timing of the closing and opening of valves 248, 266 affect the performance of the hydropower generator 210.

It will become apparent to one of ordinary skill that both increasing the diameter of the riser section 228 and providing a second vacuum tank 260 will charge the riser section 228 with a greater mass of gas just prior to the air purge step. This, in turn, increases the potential for energy recovery as gas is forced under pressure out of the riser section 228.

Figure 3A:
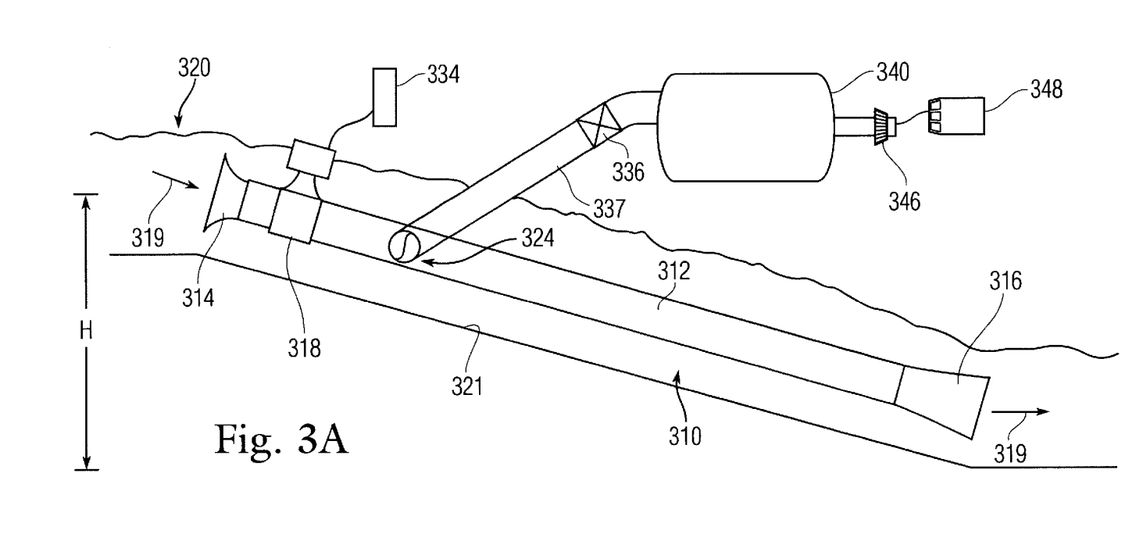
FIG. 3a is a schematic diagram sectional view of an alternative hydropower conversion system using the natural slope of a river or stream to create a hydraulic gradient, according to the present invention.
Figure 3B:
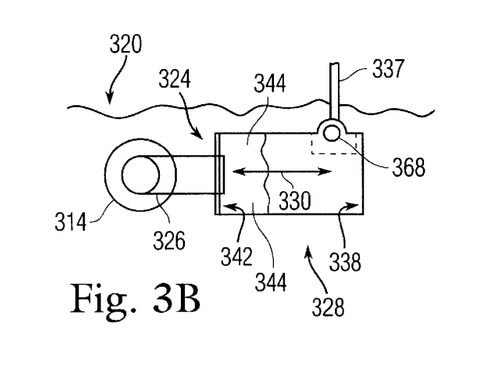
Figure 3C:
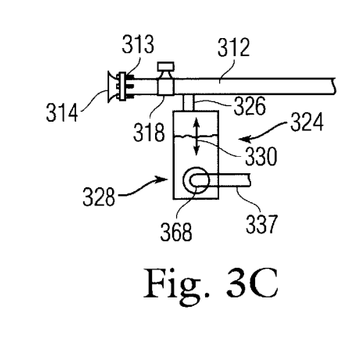

Referring now to FIGS. 3a–3c, depicted therein is a hydroelectric generator 310 which operates without the use of a dam. The hydraulic gradient, H, required for operation is established by the natural slope 321 of the river or stream channel 320. A negative pressure relief system 324 is oriented so that limited water pressure at the belled inlet 314 is sufficient to purge gas from a near horizontal riser section 328. A float 368 or other device prevents water from entering the vacuum line 337. This configuration minimizes required stream or river channel 320 alteration (e.g., via damming) and allows for unimpeded fish movement upstream and downstream in channel 320. Air turbines 346 and other power conversion equipment 348 can be located economically above flood stage elevations thereby providing for a reduction in construction costs. Coarse bars or grates (not shown) could be positioned upstream of the inlet 314 to prevent debris from entering or ramming the drive pipe 312.

In an alternative deployment, the hydropower generator system, such as hydroelectric power system 310, may be deployed in a water source having tidal flows. The hydropower generator system can utilize the tidal flow to establish a hydraulic gradient sufficient to generate the desired vacuum for power generation.

Figure 4:
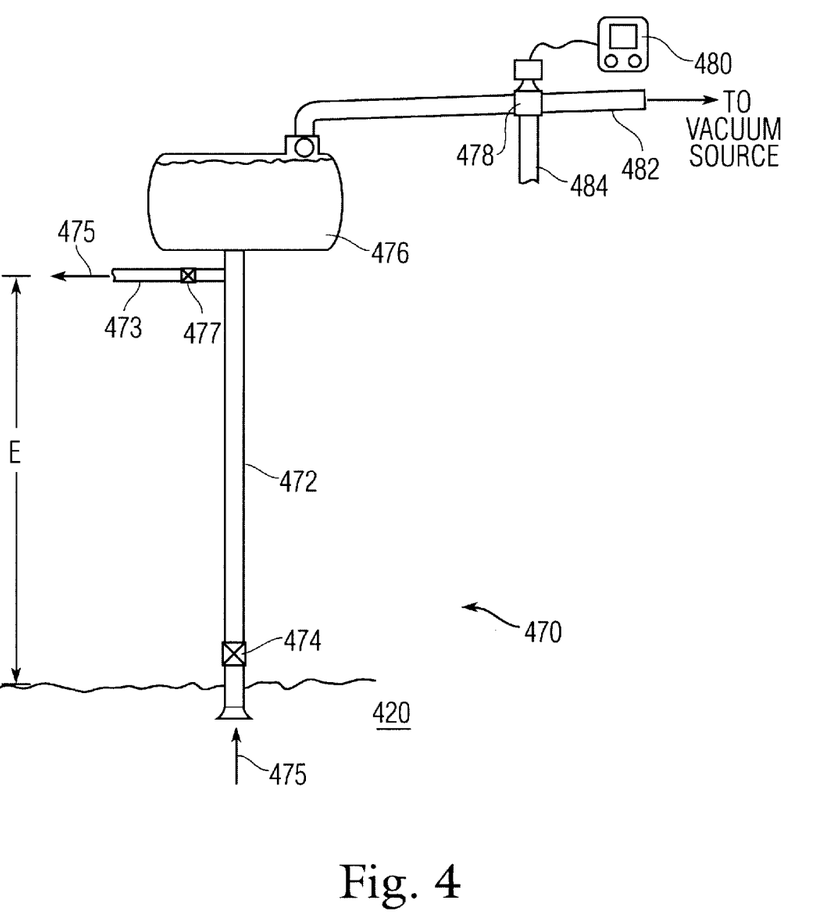
FIG. 4 is a schematic diagram of a pneumatic vacuum system for pumping water, according to the present invention.

Turning now to FIG. 4, a further pneumatic device is a water pump 470. The water pump 470 includes a pipe 472, a check valve 474, a head tank 476, a three-way control valve 478, and a controller 480 for controlling the three-way control valve 478.

The water pump 470 operates via vacuum to directly pump (i.e., lift) water 420 up pipe 472 and out through outlet pipe 473 in a direction, denoted by arrows 475, without need for energy conversion to electricity. Check valve 477 prevents air from flowing into the head tank 476 when vacuum is applied by valve 478.

A vacuum conduit 482 is connected to a vacuum source such as vacuum tank 40, 240, 260, 340 (FIGS. 1, 2, and 3). The three-way control valve 478 joins the pump conduit 482 with air vent 484. The controller 480 controls the three-way control valve 478 to alternately apply and release a vacuum so as to fill and drain water from the elevated water tank 476.

The water lifting potential is related to vacuum level and water vaporization pressure. Two or more water pumps 470 could be operated in series to increase lift potential (i.e., an elevation change denoted as elevation E).

Figure 5:
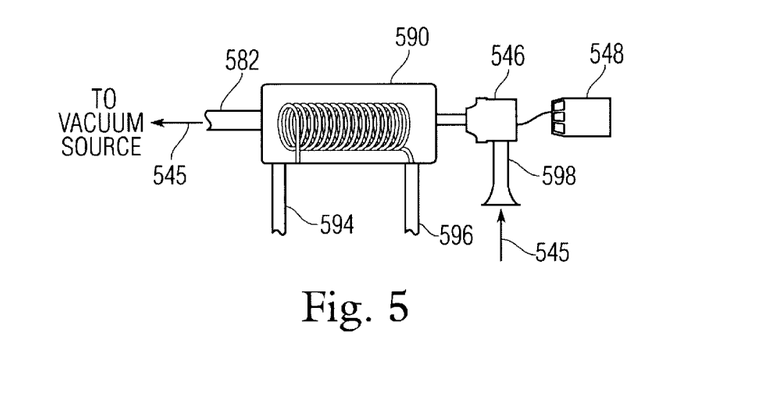
FIG. 5 is a schematic diagram of a heat exchanger, according to the present invention.

Turning now to FIG. 5, a heat exchanger 590 uses the gas cooling affect generated by the hydropower generator 10, 210, 310 for refrigeration. Cooling fluid (gas or liquid) enters the heat exchanger 590 through cooling fluid inlet 594 and exits through cooling fluid outlet 596. Gas 545 enters an air inlet 598 of a turbine 546 and proceeds through heat exchanger 590, exiting through vacuum conduit 582 onto a vacuum source.

During operation, the turbine 546 creates a decrease in pressure by expanding gas from atmospheric pressure to subatmospheric pressure. The resultant temperature drop of the gas is used to chill a cooling fluid for refrigeration.

Example:

Optimization of performance of a hydropower conversion system of the present invention is provided with reference to the following example. The following example is provided for exemplary purposes only and to enhance further understanding of the present invention but is not intended to limit the scope of the present invention.

Figure 6:
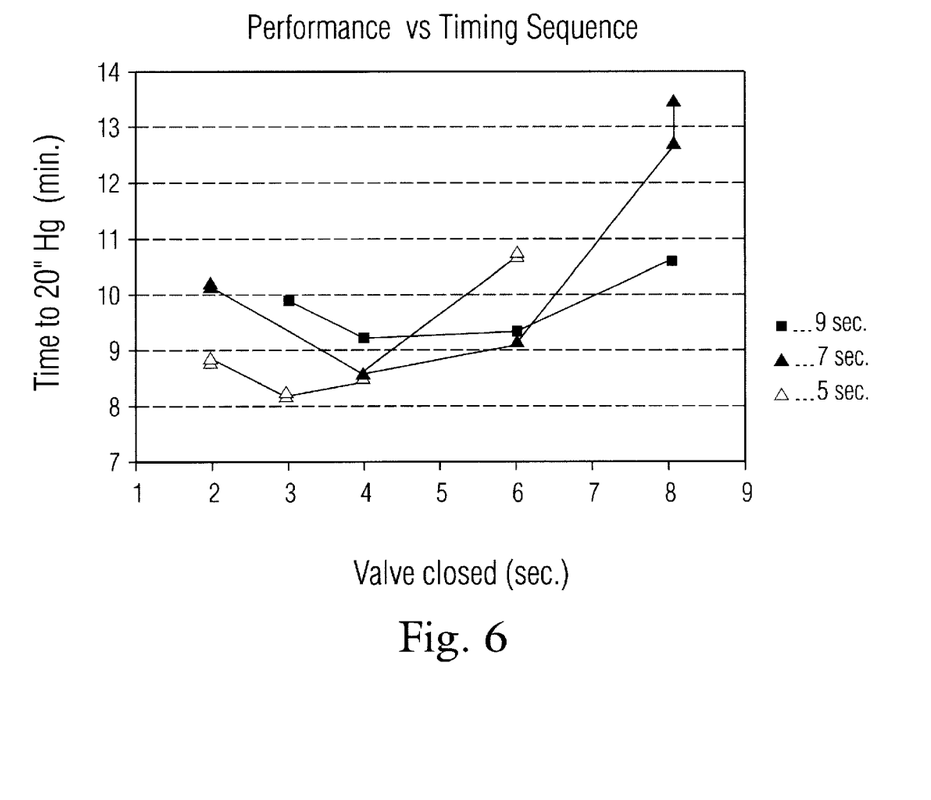
FIG. 6 is a plot depicting the performance of a hydropower conversion system as a function of the timing sequence of the valve(s) according to the present invention.
Figure 7:
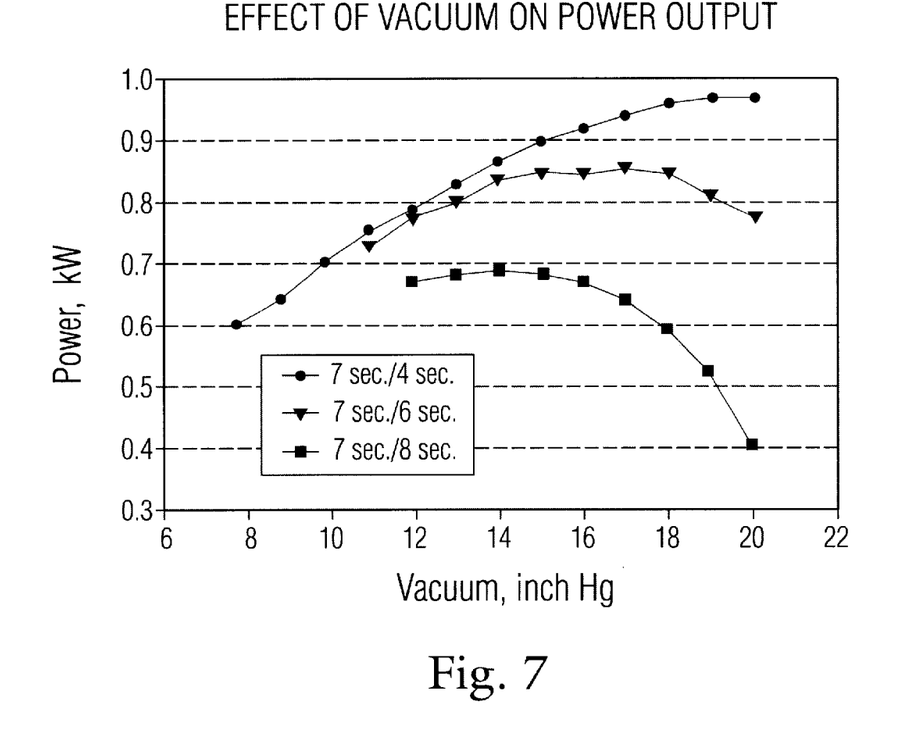
FIG. 7 is a plot depicting the effect of vacuum level on power output at three different timing sequences.

In this example, test runs were completed with a net head of 17 feet using a hydropower conversion system having two interconnected 1000 gallon vacuum tanks coupled to a 740 foot long drive pipe 8 inches in diameter. The time required to establish a vacuum of 20 inches Hg was measured for three flow periods, five, seven and nine seconds with various valve closed durations. The results were plotted as the time to establish a vacuum of 20 inches Hg versus the duration of time the valve is closed and depicted in FIG. 6. It will be readily apparent to one of ordinary skill that a valve closed duration of about 60% of the flow period (the ratio of the duration the valve is closed to the duration the valve is opened) maximized the performance of the hydropower conversion system in terms of reducing the time it takes to achieve a desired vacuum. FIG. 7 shows power output from this same system is influenced by vacuum level (inches Hg) as well as timing sequence.

In addition, additional tests indicate that water consumption decreases with increasing vacuum and shorter valve closure speeds. Further, performance may be further enhanced by increasing the diameter of the valve release riser section from 8 inches to 12 inches.

Additional optimization may be realized using a computer program developed to simulate (i.e., model) the performance of the hydropower conversion system under a wide range of operating conditions. Using such a computer model allows a series of finite difference calculations based on fluid dynamics to follow both flow acceleration and deceleration steps. For example, as described herein, energy conversion efficiencies improves as head decreases and drive pipe length increases.

It will be apparent to one of ordinary skill in the art that varying the diameters of the various conduits, pipes, vacuum tank volumes and head tank volumes will increase or decrease the performance of the hydropower generator system. For example, performance can be enhanced by increasing the diameter of the negative pressure relief riser section 28, 228, 328 from 8 to 12 inches. Further performance may be achieved by increasing the length of the drive pipe 12, 212, 312.

Described herein, the reciprocating water level in the risers 28 (FIG. 1), 228 (FIG. 2) and 328 (FIG. 3) are used to create a pressure differential allowing for air movement. Alternatively, power could be recovered by outfitting the riser with a piston and shaft assembly that moves with the water level. The shaft, in turn, would be coupled to a hydraulic pump or other mechanical means of generating useful energy.

Figure 8:
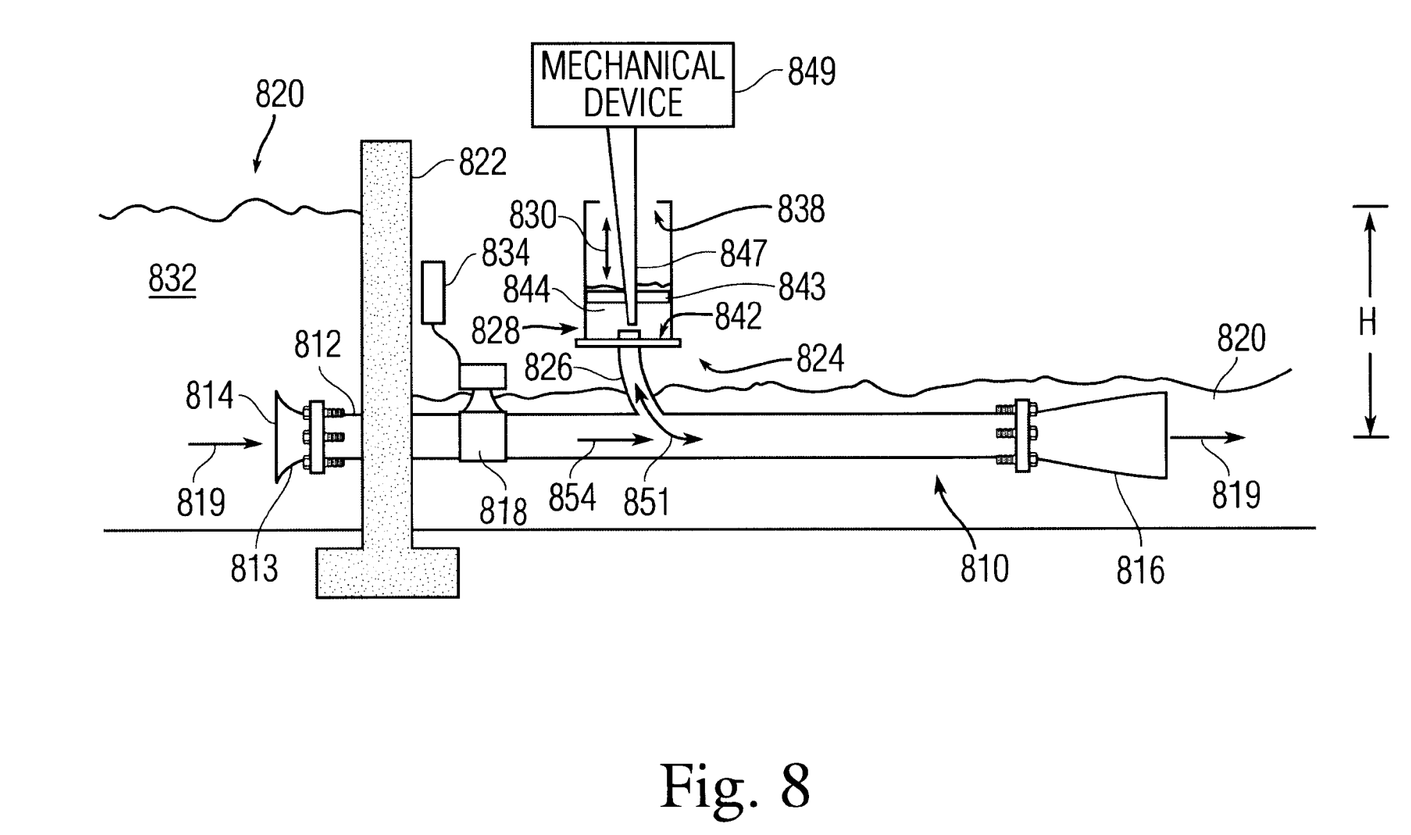
FIG. 8 is a schematic diagram of an alternative hydropower conversion system employing a riser section with a piston and shaft assembly, according to the present invention.

One preferred embodiment of a hydropower system which utilizes a riser with piston and shaft assembly is depicted in FIG. 8. Hydropower system 810 employs a pressure relief system 824 having a fluid tight (i.e. air or water) piston 843 and shaft 847 which reciprocate within pressure relief cylinder 828 as water level 844 rises and falls as denoted by arrow 830. The upper end 838 of the relief cylinder 828 is open to the environment. The piston 847 is coupled to a mechanical device 849 which may include a hydraulic pump or other mechanical device for generating useful energy.

During operation of hydropower system 810, forces applied to the shaft 847 while performing work also act to restrict movement of piston 843 and thus provide a braking force necessary to slow moving water in the drive pipe 812 following closure of valve 818. The rise and fall of the water level 844 in relief cylinder 828 occurs, in a manner similar to that in riser section 28 of hydropower system 10, i.e. via periodic closure of drive valve 818. Check valves, such as check valves 36 and 50 utilized in hydropower system 10, are unnecessary in hydropower system 810 since the upper end 838 of is open to the atmosphere.

Further, the various hydropower generator systems may be modified and are adapted as necessary for use in streams, rivers and tidal waters where conventional forms of hydropower generation are currently not feasible or acceptable. In addition, the present hydroelectric power generator system has a potential to capture additional energy from tidal waters of large hydroelectric and coal fired power plants.

In addition, the present system has a potential use by a single user or signal residence to supplement other forms of energy production such as wind, solar and geothermal. Further, the present system may be used to generate electricity, water pumping, and/or refrigeration in underdeveloped regions of the world. Further, the present system may be modified or adapted to be used as part of a localized or widespread distributed system, of diverse electric power generation sources.

Although the invention has been described above in relation to preferred embodiments thereof, it will be understood by those skilled in the art that variations and modifications can be effected in these preferred embodiments without departing from the scope and spirit of the invention.

What is claimed is:

1. A hydropower conversion system using a hydraulic gradient to accelerate a flow of water, said system comprising:
    a drive pipe having an inlet and an outlet for communicating water flow;
    a valve downstream from said inlet for interrupting the water flow in said drive pipe to thereby create a temporary negative pressure downstream from said valve;
    a negative pressure relief device, having a riser section containing water coupled to said drive pipe downstream from said valve, for pulling gas but not water into said riser section when said negative pressure relief device is subjected to said negative pressure; and
    a pneumatic device coupled to said riser section and powered by the negative pressure.

2. The hydropower conversion system of claim 1, wherein said pressure relief device is adapted to permit water but not gas to enter said drive pipe when said pressure relief device is under negative pressure.

3. The hydropower conversion system of claim 2, wherein said riser section further comprises a standing column of water to aid in pulling gas into said riser section when said negative pressure relief device is under negative pressure.

4. The hydropower conversion system of claim 1, wherein said pneumatic device comprises a power turbine for generating electricity.

5. The hydropower conversion system of claim 1, wherein said pneumatic device comprises a water pump.

6. The hydropower conversion system of claim 1, further comprising a valve controller for operating said valve.

7. The hydropower conversion system of claim 1, further comprising a power recovery device operable by a gas flow generated after the flow of water is restored in said drive pipe.

8. The hydropower conversion system of claim 1, further comprising a vacuum tank in communication with said negative pressure relief device, for storing energy as gas under vacuum.

9. The hydropower conversion system of claim 1, further comprising a refrigeration device operable by gas expansion produced from the negative pressure so generated.

10. The hydropower conversion system of claim 1, wherein said inlet comprises a belled inlet and said outlet comprises a diverging cone.

11. The hydropower conversion system of claim 1, wherein said pressure relief device is oriented at an angle such that water pressure at said inlet is sufficient to purge gas from said riser section.

12. The hydropower conversion system of claim 1, further comprising a dam for establishing the hydraulic gradient.

13. The hydropower conversion system of claim 1, wherein a natural slope of a flowing water source establishes the hydraulic gradient.

14. A method for hydropower conversion using a hydraulic gradient, said method comprising the steps of:
    using a hydraulic gradient to accelerate a quantity of water into an inlet of a drive pipe;
    introducing water into a pressure relief device
    interrupting the flow of water in the drive pipe to create a temporary negative pressure in the drive pipe;
    pulling gas into the pressure relief device coupled to the drive pipe, without introducing water into said pressure relief device, using the negative pressure; and
    powering a pneumatic device coupled to the pressure relief device from the negative pressure.

15. The method claim 14, wherein the step of pulling gas into a pressure relief device comprises preventing gas from entering the drive pipe.

16. The method of claim 14, wherein the step of powering a pneumatic device comprises powering a power turbine to generate electricity.

17. The method of claim 14, further comprising the step of operating a power recover device utilizing a gas flow generated when the flow of water in the drive pipe is restored.

18. The method of claim 14, further comprising the step of storing energy as gas under vacuum in one or more vacuum tanks in communication with the negative pressure relief device.

19. The method of claim 14, further comprising the step of utilizing gas expansion produced from said negative pressure in a refrigeration device.

20. The method of claim 14, further comprising the step of orientating the pressure relief device at an angle such that water pressure at the inlet of the drive pipe is sufficient to purge air from a riser section of the pressure relief device.

21. The method of claim 14, wherein a dam is used to establish the hydraulic gradient.

22. The method of claim 14, wherein the step of using the hydraulic gradient to accelerate a quantity of water comprises locating the drive pipe in a flowing water source having a slope which establishes the hydraulic gradient.

23. The method of claim 14, wherein the hydraulic gradient is established by tidal water flow.

24. The method of claim 14, wherein the hydraulic gradient is established by tailwater flow downstream from a hydroelectric or coal fired power plant.

25. The method of claim 14, wherein the step of interrupting the flow of water comprises interrupting the flow of water from 30 to 80 percent of a flow period.

26. The method of claim 14, wherein the step of interrupting the flow of water comprises interrupting the flow of water for about 60 percent of the flow period.

27. The method of claim 14, wherein the step of interrupting the flow of water comprises minimizing the time to create a desired negative pressure by optimizing the duration the flow of water is interrupted.

28. A method for hydropower conversion using a hydraulic gradient, said method comprising the steps of:

using a hydraulic gradient to accelerate a quantity of water into an inlet of a drive pipe;

interrupting the flow of water in the drive pipe to create a temporary negative pressure in the drive pipe;

using the negative pressure established in the drive pipe to move a piston positioned in a pressure relief cylinder; and powering a mechanical device coupled to the piston.

29. A hydropower conversion system using a hydraulic gradient to accelerate a flow of water, said system comprising:

a drive pipe having an inlet and an outlet for communicating water flow;

a valve downstream from said inlet for interrupting the water flow in said drive pipe to thereby create a temporary negative pressure downstream from said valve;

a negative pressure relief device having a riser cylinder coupled to said drive pipe downstream from said valve, said riser cylinder having a piston and shaft reciprocally disposed therein; and a mechanical device coupled to said shaft.

\* \* \* \* \*